United States Patent [19]

Boinot et al.

[11] Patent Number: 4,962,166
[45] Date of Patent: * Oct. 9, 1990

[54] MANUFACTURE OF CREEP-FREE PREPREGS BASED ON PHENOLIC RESINS

[75] Inventors: Francois Boinot, Lievin; Michel Cousin, Loison-Sous-Lens, both of France

[73] Assignee: Norsolor, Paris la Defense, France

[*] Notice: The portion of the term of this patent subsequent to Mar. 27, 2007 has been disclaimed.

[21] Appl. No.: 233,935

[22] Filed: Aug. 18, 1988

Related U.S. Application Data

[63] Continuation of Ser. No. 917,458, Oct. 10, 1986, abandoned.

[30] Foreign Application Priority Data

Oct. 10, 1985 [FR] France .................... 85 15007

[51] Int. Cl.$^5$ ............................. C08L 61/14
[52] U.S. Cl. ....................... 525/506; 427/221; 427/412; 428/265; 428/278; 428/373; 428/396; 524/541; 528/139; 528/140
[58] Field of Search ............... 525/506; 528/140, 139; 427/221, 412; 428/265, 278, 393, 396; 524/541

[56] References Cited

U.S. PATENT DOCUMENTS

| | | | |
|---|---|---|---|
| 2,221,511 | 11/1940 | Fiedler et al. | 528/140 X |
| 2,388,533 | 6/1942 | Kreidl et al. | 528/140 X |
| 2,606,889 | 8/1952 | Ward et al. | 525/506 X |
| 2,889,241 | 6/1959 | Gregory et al. | 428/531 X |
| 3,298,973 | 1/1967 | Quarles et al. | 528/140 X |
| 3,663,489 | 5/1972 | Byerley et al. | 525/504 X |
| 3,740,358 | 6/1973 | Christie et al. | 525/480 X |
| 3,897,387 | 7/1975 | O'Shaughnessy . | |
| 4,045,398 | 8/1977 | Dahms | 428/436 X |
| 4,105,604 | 8/1978 | Vargiu et al. | 528/132 X |
| 4,123,414 | 10/1978 | Milette | 528/138 X |
| 4,555,544 | 11/1985 | Meyer et al. | 525/504 X |
| 4,912,178 | 3/1990 | Boinot et al. | 525/506 |

FOREIGN PATENT DOCUMENTS

| | | |
|---|---|---|
| 676219 | 8/1966 | Belgium . |
| 2568575 | 2/1986 | France . |
| 901663 | 7/1962 | United Kingdom . |
| 1144192 | 3/1969 | United Kingdom . |

OTHER PUBLICATIONS

Kirk et al., Encyclopedia of Chemical Technology, vol. 3, (1964), pp. 613, 614, 617–619 and 641.
Chem. Abstracts 96:569672t, 1986.

*Primary Examiner*—Howard E. Schain
*Attorney, Agent, or Firm*—Millen, White & Zelano

[57] ABSTRACT

In the manufacture of creep-free prepregs based on phenolic resins of the resole type, the reinformcing agents are impregnated with an essentially solvent-free mixture of a phenolic resin and a viscosity controlling amount up to 60% by weight of the resin of an alkali metal metaborate or an alkaline-earth metaborate or a mixture thereof. The resultant compression molded articles exhibit improved strengths.

8 Claims, No Drawings

MANUFACTURE OF CREEP-FREE PREPREGS BASED ON PHENOLIC RESINS

This application is a continuation of application Ser. No. 06/917,458, filed Oct. 10, 1986 now abandoned.

CROSS REFERENCE TO RELATED APPLICATION

This application is related to co-assigned application Ser. No. 118,063, filed Nov. 6, 1987 now U.S. Pat. No. 4,912,178, which is a continuation of Ser. No. 762,482 filed Aug. 5, 1985, "New Phenolic Resin Composition" now abandoned, the contents thereof being incorporated herein.

BACKGROUND OF THE INVENTION

The present invention relates to a new process for the preparation of creep-free prepregs based on phenolic resins, as well as resultant prepregs and finished molded products produced therefrom.

Prepregs are mixed materials which are prepared from thermosetting resins and reinforcing agents and, if desired, fillers. The reinforcing agents employed are in the form of fibers such as cellulose fibers, or glass fibers, in particular glass fiber rovings; nonwovens made, for example, of high molecular weight polyester, of polyvinyl chloride, glass fiber matting; or of woven material made, for example, of aromatic polyamide, of glass or of asbestos. The advantage of these prepreg materials is that they can be directly compression molded without the molder having the need beforehand to prepare a mixture of resin, catalysts, fillers and pigments. Prepregs can be classified into two categories: on the one hand, prepregs which are known as "creep-free" or "non-flowable" and, on the other hand, prepregs which are known as "creeping" or "flowable". "Creep-free" prepregs generally consist solely of glass fiber cloth reinforcements impregnated with a suitable resin taken to an appropriate stage of partial polymerization, a stage known as "B". At this stage, resins are, in practice, no longer tacky, but are still soluble and meltable. When placed in a heated press, such a mixed material allows the resin to move between the fibers and results in a uniform distribution of the glass and the resin. After the mold has been closed, the resin is set completely. Creep-free prepregs are manufactured from epoxy resins, from phenol formaldehyde resins and also from polyester resins based on diallyl phthalate.

The processes used heretofore were based on the use of solvent solutions of resins. Thus, creep-free prepregs manufactured from phenolic resins are produced from phenolic resins dissolved in a solvent, an alcohol in particular; the glass fiber cloth is impregnated with the resin in the form of solution, and this permits better dispersion of the resin in the glass cloth. The solvent is then evaporated off in an oven.

After impregnation, the mixed material is placed in a heated compression mold. Processes of this kind yield finished products which may have the disadvantage of disintegrating in use, and this greatly restricts their fields of application; they are used, in particular, principally for the manufacture of integrated circuits or of material of construction in the aeronautical field.

The major difficulty which needs to be overcome in order to manufacture these creep-free prepregs from a resin which does not contain a solvent is to have available a resin which is sufficiently fluid at 50° C. so as to be capable of being properly wetting the glass cloth and which must therefore show practically no change in viscosity during the first hours at ambient temperature.

In addition, once the first 24 hours have elapsed, it is essential that this viscosity changes rapidly with time at ambient temperature, and also at a higher temperature, so that a creep-free prepreg of a suitable pegosity can be obtained. ("Pegosity" means that the viscosity value of the prepreg is such that the product sticks lightly to fingers).

It may be seen, therefore, that there is a whole series of conflicting problems to be solved, it being necessary for the solution to these problems to lead to the production of phenolic resins having a matched viscosity, but also a viscosity which is capable of changing with time in a particular manner.

A need is thus perceived to develop phenolic resins containing no solvent and being suitable for the manufacture of creep-free prepregs.

Referring now to the manufacture of creeping or flowable prepregs, also known as "prepreg mats", it is known to add a thickener chosen from alkaline-earth metal oxides such as magnesium oxide. The addition of a compound of this kind to the polyester resin makes it possible to obtain not only a resin having a desired viscosity, but also a sufficient stability which enables the resin not to thicken too quickly, with the risk of producing mediocre impregnation of the chopped glass fibers used in the creeping prepreg mat technique.

It might be reasonable to expect that a mere adaptation of the alkaline-earth metal oxides employed for polyester resins in the creeping prepreg technique to the phenolic resins employed in the creep-free prepreg technique would have made it possible to obtain phenolic resin dough compositions suitable for the manufacture of creep-free phenolic prepregs. Unfortunately, this is not the case at all. It was found, in fact, that the addition of an alkaline-earth metal oxide to phenolic resins results in resin compositions which are not homogeneous, but rather exhibiting, in particular, a surface crust. In addition, the use of an alkaline-earth metal oxide results in phenolic resins whose viscosity changes too quickly with time and which consequently can no longer be used.

SUMMARY OF THE INVENTION

One object of the present invention is to provide in the process for the manufacture of creep-free prepregs based on phenolic resins of the resole type and of pigment fillers if desired, the improvement wherein a sufficient amount, up to 60% by weight of the resin, of an additive consisting solely or essentially of an alkali metal metaborate or an alkaline-earth metal metaborate is added to the phenolic resin.

Upon further study of the specification and appended claims, further objects and advantages of this invention will become apparent to those skilled in the art.

It has been found, in fact, that the use of a metaborate additive of this kind makes it possible to obtain a homogeneous resin composition, a composition whose viscosity is substantially stable, i.e., it changes little, preferably not more than about 50 times initial value during the first 24 hours and subsequently changes in a suitable manner. A composition is thus obtained which is endowed with such properties that it permits the manufacture of creep-free prepregs. By the viscosity changing in a suitable manner is meant that after the first 24 hours, viscosity is about equal to 2 times value of the first 24 hours, after at least a new period of 24 hours.

According to another characteristic of the composition of the invention, the quantity of additive employed does not exceed 60% by weight based on the weight of the phenolic resin solution employed and is preferably between 2 and 40% by weight, more preferably between 3 and 30 % and especially between 4 and 20 %, by weight. Below 2%, practically no effect on the viscosity of the composition is observed; above 60% by weight, it is no longer possible to have complete control of the viscosity of the composition, and this makes it unsuitable for the manufacture of creep-free prepregs.

The alkali metal or alkaline-earth metal metaborates used to produce the phenolic resin prepregs are preferably chosen from barium or lithium or calcium metaborates. The barium salt is preferably employed for reasons of availability and of ease of access.

Compared to the previous processes, the process of the present application has the advantage of not requiring the use of solvents, and this makes it possible to have available phenolic resins which are especially suitable for the manufacture of creep-free prepregs. Thus, the resin mixture used to impregnate the reinforcing agent is essentially free of solvent.

The satisfactory suitability of these essentially solvent-free resins is illustrated by the mechanical properties of resultant compression molded prepregs; in point of fact, better properties are found for the finished product based on the prepregs prepared according to the present application than for the finished compression molded products based on prepregs produced with solvent solutions of phenolic resins.

The resoles used for the manufacture of the compositions according to the invention are known resoles prepared by the condensation of formaldehyde with phenol in the presence of an alkaline catalyst. They have a F/P molar ratio of between 1.2 and 2.5 and, if desired, contain additives such as plasticizers, surfactants and fillers such as silica, kaolin and aluminum hydroxide. Another advantage of the process of the invention is such that the phenolic resins prepared in this manner are such that they do not require hardening catalysts to be added; the crosslinking of these resins thus takes place solely by means of heat and at a low pressure of less than 30 bars.

Reinforcing agents, in particular, glass cloths, carbon cloths, polyamide cloths, etc. are used in a known manner for the manufacture of the creep-free prepregs.

The quantity of cloths which are used is such that the finished prepreg mat contains at most 80% by weight of these relative to the total weight of the finished material. Preferably the finished prepreg mat contain about 30 to 80 % by weight of reinforcing mat by weight of resole resin in the "B" stage.

The process of the invention makes it possible to manufacture creep free prepregs which exhibit good mechanical properties as well as improved fire and combustion resistance, and this extends their fields of application, especially to rolling stock for public transportation: railways, underground railways and aircraft. In addition, the material has an improved heat behavior.

The creep-free prepregs produced according to the invention may be used after being stored in a known manner, by being formed into the desired shape in compression molds at, e.g., pressures of between 1 and 100 bars for 1 to 10 minutes per millimeter of thickness at a temperature of between 100° and 200° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

100 parts by weight of a phenolic resin which has the following properties are used:
F/P molar ratio: 1.5/1 (F=formaldehyde and P=Phenol)
Viscosity at 20° C.: 45 Pa s
Solids content: 95%, the remainder being constituted by volatile products.
Reactivity: 2 minutes (determined according to a conventional method which consists of measuring the exotherm peak of a resin to which 10% of sulphuric acid and of ethanol have been added.

7.5 parts of calcium metaborate are added to this resin. A fine homogeneous composition which remains homogeneous after thickening is obtained. After the addition of calcium metaborate the viscosity of the mixture is 68 Pa s
After 4 hours it is 68 Pa s
After 6 hours it is 70 Pa s
After 20 hours it is 72 Pa s.

EXAMPLE 2

100 parts of the resin of Example 1 are combined with 7.5 parts of magnesium oxide, the latter being known to be with polyesters for the manufacture of creeping prepregs.

The viscosity changes in the following manner:

| Time (hours) | 0 | 1 | 2 | 3 | 4 | 5 | 6 |
|---|---|---|---|---|---|---|---|
| Viscosity (Pa s) | 304 | 1030 | 2600 | 5600 | 7800 | 14500 | $10^5$ |

EXAMPLE 3

Example 1 is repeated with a resin which has the following properties:
Solids content: 85%,
Viscosity: 5.5 Pa s.
The viscosity changes in the following manner:

| Time (days) | 0 | 1 | 3 | 5 | 10 | 12 | 29 |
|---|---|---|---|---|---|---|---|
| Viscosity (Pa s) | 5.5 | 250 | 1500 | 5000 | 15000 | 22000 | 45000 |

EXAMPLE 4

Example 1 is repeated. The following table shows the change in the viscosity as a function of temperature:

| Temperature (°C.) | 20 | 30 | 40 | 50 |
|---|---|---|---|---|
| Viscosity (Pa s) | 68 | 17 | 6 | 2.3 |

When maintained at 50° C., the same resin changes in the following manner:

| Time (hours) | 0 | 17 | 34 |
|---|---|---|---|
| Viscosity (Pa s) at 20° C. | 45 | 80 | 190 |

EXAMPLE 5

The phenolic resin of Example 1 is employed.

7.5 parts by weight of calcium metaborate are added to this resin. A prepreg is then manufactured using the glasscloth sold by the Chomarat Company under the reference Chomarat 500: this product has a weight per unit area of 500 g/m$^2$. An 8-layer prepreg 2.2 mm in thickness is produced. The prepreg contains 75% of glass.

This prepreg is cured at 145° C. for 15 minutes and is subjected to a pressure of 5 bars in a press.

The finished product has the following properties:

| Flexure (MPa) French Standard NFT 51001 | Modulus 30,000 | Stress 800 |
|---|---|---|
| Barcol hardness | | 70 |

By way of comparison, a commercial prepreg is used to produce a material also consisting of 8 layers and 2.2 mm thick. This phenolic prepreg is manufactured by means of the known process employing solvents. It is molded under the same conditions as above. The finished product has the following properties:

| Flexure (MPa) | Modulus 28,500 | Stress 400 |
|---|---|---|
| Barcol hardness | | 65 |

EXAMPLE 6

A resin which has the following properties is used:
Viscosity at 20° C.: 27 Pa s
Solids content: 93%.

Various quantities of barium metaborate are added to this resin. The following table shows the change in viscosity for various quantities of barium metaborate.

| | Viscosity (Pa s) Barium metaborate content % | | | |
|---|---|---|---|---|
| Time (days) | 5 | 8 | 10 | 13 | 15 |
| 0 | 45.0 | 55 | 54 | 13 | |
| 5 | 412 | 1090 | 2000 | 5160 | |
| 11 | 872 | 6960 | >16000 | → | |

EXAMPLE 7

100 parts by weight of a phenolic resin which has a solids content of 96% are used with 8.5 parts of lithium metaborate. The viscosity of the mixture changes in the following manner:

| Time (days) | 0 | 1 | 7 |
|---|---|---|---|
| Viscosity (Pa s) | 82.0 | 178 | 215 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the manufacture of creep-free prepregs based on phenolic resins of the resole type, comprising impregnating fibrous reinforcing agents with a phenolic resole resin, the improvement comprising employing an essentially solvent-free phenolic resole resin containing about 85% solids and controlling the viscosity of the resin comprising adding a viscosity controlling amount of up to 60% by weight of the resin of an additive, said additive consisting essentially of a lithium metaborate or an alkaline-earth metaborate or a mixture thereof, the resultant impregnating composition being initially fluid and having a viscosity which does not change more than about 50 times the initial value during the first 24 hours and which changes by a factor of about 2 in the next 24 hour period, the resultant creep-free prepreg containing about 30 to 80% by weight of a reinforcing mat by weight of resole resin in the "B" stage.

2. A process according to claim 1, wherein the quantity of additive employed is between 2 and 40% by weight based on the weight of the phenolic resin.

3. A process according to claim 1, wherein the additive is barium metaborate.

4. A process according to claim 3, wherein the resole has a formaldehyde to phenol molar ratio of 1.2:1 to 2.5:1.

5. A process according to claim 1, wherein the viscosity controlling additive is added to a phenolic resin solution in a proportion of between 3 and 30% by weight of the additive to the phenolic resin.

6. A process according to claim 1, wherein the viscosity controlling additive is added to a phenolic resin solution in a proportion of between 4 and 20% by weight of the additive to the phenolic resin.

7. A process according to claim 1 wherein the phenolic resole resin is free of solvent.

8. A process according to claim 1 wherein the fibrous reinforcing agent is a glass fiber mat.

* * * * *